United States Patent Office 3,178,415
Patented Apr. 13, 1965

3,178,415
19-SUBSTITUTED 5α-HALOGEN-6β:19-OXIDO-ANDROSTANES
Albert Wettstein, Riehen, Georg Anner, Karl Heusler, and Jaroslav Kalvoda, Basel, Hellmut Ueberwasser, Riehen, and Jules Heer, Binningen, Switzerland, assignors to Ciba Corporation, New York, N.Y., a corporation of Delaware
No Drawing. Filed Sept. 7, 1962, Ser. No. 222,203
Claims priority, application Switzerland, July 15, 1960, 8,133/60; Oct. 28, 1960, 12,107/60; Dec. 23, 1960, 14,393/60; Apr. 5, 1961, 3,989/61; June 2, 1961, 6,479/61; June 13, 1961, 6,895/61; Sept. 18, 1961, 10,803/61
5 Claims. (Cl. 260—239.55)

This application is a continuation-in-part of our copending application Ser. No. 122,657, filed July 10, 1961, now abandoned, by Albert Wettstein et al.

The present invention relates to novel 3:19-dioxygenated 5α-halogen-6β:19-oxido-androstanes, more especially to compounds of the formula

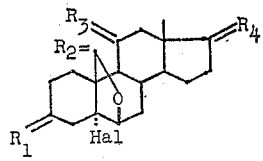

wherein $R_1$ and $R_2$ stand for oxo or hydrogen together with hydroxy or acyloxy, $R_3$ stands for hydrogen, oxo or hydrogen and hydroxy or acyloxy, $R_4$ stands for oxo, β-hydroxy or β-acyloxy together with hydrogen, lower alkyl, lower alkenyl or lower alkinyl and Hal stands for a halogen atom with an atomic weight above 30, especially for bromine or chlorine.

The acyloxy radicals mentioned above, representing esterified hydroxyl groups, are more especially those of aliphatic, cycloaliphatic, cycloaliphatic-aliphatic, araliphatic, aromatic or heterocyclic carboxylic acids containing at most 15 carbon atoms, such as for example, formic, acetic, propionic, butyric, valeric, trimethylacetic, caproic, oenanthic, decanoic, trifluoracetic, carbonic-monomethyl- or ethylester, hexahydrobenzoic, cyclopentyl-propionic, phenyl-propionic, benzoic or furoic acid. The lower alkyl, alkenyl or alkinyl radicals are such as contain at most 7 carbon atoms, for example methyl, ethyl, n- or i-propyl, -butyl, -pentyl, -hexyl or -heptyl, vinyl, allyl, methallyl, ethinyl, 2-methyl-ethinyl, 2-chloroethinyl and 2-trifluoromethyl-ethinyl.

The compounds of the present invention are extremely valuable intermediates in a technically important, simple process for the manufacture of 19-nor-androstanes to which class of compounds belong several well known androgenic, anabolic and gestagenic agents as well as ovulation inhibitors such as 19-nor-testosterone and its esters, 17α-methyl-19-nor-testosterone, 17α-ethinyl-19-nor-testosterone, $\Delta^{5(10)}$-3-oxo-17β-hydroxy-17α-ethinyl-19-nor-testosterone.

The 19-nor-androstanes are produced from the 3:19-dioxygenated 5α-halogen-6β:19-oxido-androstanes of the present invention by treating them with zinc and acetic acid at elevated temperature whereby $\Delta^5$-19-oxo-androstane or $\Delta^5$-androstane-19-acids are formed. After converting the 3-substituent into a 3-oxo-group (e.g., by hydrolysis of a 3-acyloxy group and oxidation of a 3-hydroxy group formed) 19-oxygenated $\Delta^4$-3-ketones are obtained from which the angular C-19-substituent is eliminated in known manner.

Among the 19-oxygenated 5α-halogen-6β:19-oxido-androstane of the present invention the following are particularly important. 3β:11α:17β:19-tetrahydroxy-5α-bromo-6β:19-oxido-androstane and its esters, 3β:11α:17β:19-tetrahydroxy-5α-bromo-6β:19-oxido-17α-methyl androstane, the 19:6β-lactones of 3β:6β:17β-trihydroxy-5α-chloro- and -5α-bromo-androstane-19-acid, of 3β:6β-dihydroxy-5α-chloro- and -5α-bromo-17-oxo-androstane-19-acid and of 3β:6β:17β-trihydroxy-5α-bromo- and -5α-chloro-17α-methyl-androstane-19-acid and the corresponding compounds in which some or all of the free hydroxy groups are esterified.

The above lactones are obtained from the corresponding 19-unsubstituted 6β:19-oxido-androstanes by oxidation with chromium trioxide in acetic acid at a temperature of 60 to 80° C. The 19-unsubstituted 6β:19-oxido-androstanes are obtained either by treating a 5α-halogen-6β-hydroxy-androstane with lead tetraacetate in boiling benzene or cyclohexane for several hours or by reacting a 5α-halogen-6β-hydroxy-androstane in boiling cyclohexane solution with monovalent, positive iodine preferably in the presence of free iodine and strong visible light for 10 to 90 minutes. The monovalent positive iodine may be obtained from N-iodo-succinimide or from silver acetate and iodine or mercuric acetate and iodine. An especially efficient method for the preparation of the 5α-halogen-6β:19-oxido-androstanes consists in treating a 5α-halogen-6β-hydroxy-androstane in an apolar solvent, e.g., in boiling cyclohexane solution with lead tetraacetate and iodine. If 11-oxygenated (especially 11α-acyloxy)-5α-halogen-6β-hydroxy-androstanes are treated with lead tetraacetate and iodine under the above defined conditions, 5α-halogen-6β:19-oxido-19-hydroxy-androstane are formed directly during the reaction. These may be oxidized to 19:6β-lactones with chromium trioxide in acetone-sulfuric acid at last temperature.

The following examples illustrate the invention. The temperatures are given in centigrades.

Example 1

(a) A suspension of 22.0 grams of calcium carbonate and 66.0 grams of dried lead tetraacetate in 3.3 liters of cyclohexane is heated to 80° C., 17.6 grams of iodine are added, and the mixture is refluxed and stirred for 20 minutes in the dark. The slightly cooled reaction solution is treated with 11.0 grams of 3β-acetoxy-5α-chloro-6β-hydroxy-17-oxoandrostane and then refluxed with stirring for 2 hours in daylight. The cooled reaction mixture is filtered, the residue exhaustively washed with absolute ether and the filtrate is washed with sodium thiosulfate solution of 10% strength and with water. Evaporation of the dried solution under vacuum yields 12.1 grams of a crystalline product which, after recrystallization from ether+methanol, yields 7.65 grams of 3β-acetoxy-5α-chloro-6β:19-oxido-17-oxo-androstane melting at 180 to 182° C. The infra-red absorption spectrum of the pure compound contains bands, inter alia, at 5.76, 6.73, 7.35, 8.10, 9.65, 10.60, 10.82, 11.35, 11.67 and 12.50μ.

(b) A solution of 5 grams of 3β-acetoxy-5α-chloro-6β:19-oxido-17-oxo-androstane in 100 cc. of glacial acetic acid is treated at 85 to 90° C. within 30 minutes with a solution of 7.5 grams of chromium trioxide in 7.5 cc. of water and 60 cc. of glacial acetic acid. After another 15 minutes the reaction mixture is diluted with water and extracted with methylene chloride. The methylene chloride solution is washed with water and then with sodium bicarbonate solution, dried with sodium sulfate and evaporated, to yield 2.2 grams of the 19:6β-lactone of 3β-acetoxy-5α-chloro - 6β - hydroxy-17-oxo-androstane-19-acid which is crystallized by adding ether and freed from any residual oxido compound by recrystallization from alcohol. The pure lactone melts at 198 to 199° C.

In an identical manner to that outlined in parent application Serial No. 122,657, page 3, lines 6–15, there is prepared From Δ⁵-3β:17β-diacetoxy-androstene the 3β:17β-diacetoxy-5α-chloro-6β-hydroxy-androstane melting at 197–199°

From Δ⁵-3β-acetoxy-17β-hydroxy-17α-methyl - androstene the 3β-acetoxy - 5α - chloro - 6β:17β - dihydroxy-17α-methyl-androstane melting at 179–181° and From Δ⁵ - 3β:17β - diacetoxy - 17α - methyl-androstene the 3β:17β-diacetoxy - 5α - chloro-6β-hydroxy-17α-methyl-androstane.

*Example 2*

(a) A mixture of 150 cc. of cyclohexane, 1.0 gram of calcium carbonate, 3.0 grams of lead tetraacetate and 980 mg. of iodine is heated for ½ hour with stirring at 80° C. in the dark. 500 mg. of 3β:17β-diacetoxy-5α-chloro-6β-hydroxy-androstane are added and the reaction mixture is refluxed further (1½ to 2½ hours) until it has lost its color. The cooled solution is filtered, the residue is washed with ether, and the filtrate is washed with sodium thiosulfate solution of 10% strength and water, dried and evaporated under reduced pressure. Yield: 620 mg. of amorphous 3β:17β-diacetoxy-5α-chloro-6β:19-oxido-androstane mixed with a small amount of a sparingly volatile oil of aromatic odour; the product is purified on alumina. After crystallization from alcohol the pure compound melts at 160 to 161° C. Its infra-red spectrum contains, in addition to the strong acetate absorptions at 5.76, 8.16 and 9.65μ, absorption bands at 6.72, 10.60, 10.75 and 12.51μ.

(b) When 1 gram of the 3β:17β-diacetoxy-5α-chloro-6β:19-oxido-androstane described in part (a) is dissolved in 25 cc. of glacial acetic acid and treated with 1.5 grams of chromium trioxide at 85 to 90° C. as described in Example 1, part (b) there is obtained 0.88 gram of the lactone of 3β:17β-diacetoxy-5α-chloro-6β-hydroxy-androstane-19-acid melting at 185 to 186° C.

*Example 3*

When a suspension of 5.0 grams of mercuric acetate and 2.5 grams of 3β-acetoxy-5α-chloro-6β-hydroxy-17-oxo-androstane in 100 cc. of carbon tetrachloride is heated to the boil for 16 hours in the dark after the addition of 3.98 grams of iodine and the violet solution is then worked up as described in Example 2, there are obtained 2.72 grams of a crystalline crude product which in the infra-red spectrum shows in the CO area a distinct band at 5.60μ in addition to the bands of the 17-ketone and the 3-acetate at 5.80μ and which consists chiefly of 3β-acetoxy-5α-chloro-6β:19-oxido-17-oxo-androstane. The crude product contains in addition a small quantity of 6β:19-lactone of 3β-acetoxy-5α-chloro-6β-hydroxy-17-oxo-androstane-19-acid.

*Example 4*

8.75 grams of lead tetraacetate and 4.0 grams of calcium carbonate are suspended in 200 ml. of carbon tetrachloride. After the addition of 2.0 grams of 3β:11α:17β-triacetoxy-5α-chloro-6β-hydroxy-17α-methyl - androstane (prepared from Δ⁴-3-oxo-11α:17β-dihydroxy-17α-methyl-androstene by acetylation to the 11α:17β-diacetate and enolacetylation to give Δ³·⁵-3:11α:17β-triacetoxy-17α-methyl-androstadiene, sodium borohydride reduction, reacetylation and addition of hypochlorous acid to the 5:6-double bond) and of 2.57 grams of iodine the reactive mixture is stirred and boiled under reflux while irradiating with a 500 watt lamp until the color of iodine disappears (about 30 minutes). The cooled reaction mixture is processed as described in the previous example. The residue (11.2 grams) contains a mixture of the 3β:11α:17β - triacetoxy-5α-chloro-6β:19-oxido-17α-methyl-androstane and the 3β:11α:17β-triacetoxy-5α-chloro-6β:19-oxido-19-hydroxy-17α-methyl-androstane which is separated by chromatographic on 30 grams of alumina.

What is claimed is:
1. The 19:6β-lactone of the 3β-acetoxy-5α-chloro-6β-hydroxy-17-oxo-androstane-19-acid.
2. The 19:6β-lactone of the 3β:17β-diacetoxy-5α-chloro-androstane-19-acid.
3. 3β:11α:17β - triacetoxy-5α-chloro-6β:19-oxido-17α-methyl-19-hydroxy-androstane.
4. 3:19-oxygenated 5α-halo-6β:19-oxido-androstanes of the formula

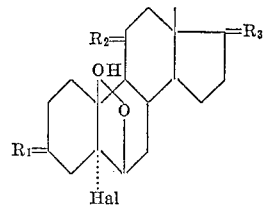

wherein R₁ stands for a member selected from the group consisting of hydroxy together with hydrogen and acyloxy together with hydrogen, R₂ stands for a member selected from the group consisting of α-hydroxy together with hydrogen, α-acyloxy together with hydrogen and two hydrogen atoms, R₃ stands for a member selected from the group consisting of oxo, hydrogen together with β-hydroxy, hydrogen together with β-acyloxy and β-hydroxy together with a lower alkyl, said acyloxy groups being derived from carboxylic acids having 1 to 15 carbon atoms, and Hal stands for a member selected from the group consisting of chlorine and bromine.

5. 3:19-oxygenated 5β-halo-6β:19-oxido-androstanes of the formula

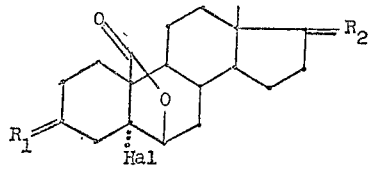

wherein R₁ stands for a member selected from the group consisting of hydroxy together with hydrogen and acyloxy together with hydrogen, R₂ stands for a member selected from the group consisting of oxo, hydrogen and a β-hydroxy group and hydrogen with a β-acyloxy group, said acyloxy groups being derived from carboxylic acids having 1 to 15 carbon atoms, and Hal stands for a member selected from the group consisting of chlorine and bromine.

References Cited by the Examiner
UNITED STATES PATENTS
3,001,989   9/61   Ringold et al. _____ 260—239.57

LEWIS GOTTS, *Primary Examiner.*